United States Patent [19]

Tsutsumi et al.

[11] 4,442,808
[45] Apr. 17, 1984

[54] COMBUSTION CHAMBER FOR SPARK IGNITION INTERNAL COMBUSTION ENGINE

[75] Inventors: Saburo Tsutsumi, Yokohama; Kichihiko Dozono; Yutaka Matayoshi, both of Yokosuka; Kazuya Kunii, Yokohama, all of Japan

[73] Assignee: Nissan Motor Company, Limited, Yokohama, Japan

[21] Appl. No.: 215,082

[22] Filed: Dec. 10, 1980

[30] Foreign Application Priority Data

Dec. 11, 1979 [JP] Japan ............................ 54-171506[U]

[51] Int. Cl.³ .............................................. F02F 3/26
[52] U.S. Cl. ..................................... 123/279; 123/260
[58] Field of Search ................ 123/657, 279, 260, 276

[56] References Cited

U.S. PATENT DOCUMENTS

| | | | |
|---|---|---|---|
| 2,041,073 | 5/1936 | LaBrie | 123/279 |
| 2,749,901 | 6/1956 | Mitchell | 123/279 |
| 3,455,282 | 7/1969 | Pearsall | 123/260 |
| 3,999,532 | 12/1976 | Kornhauser | 123/279 |

Primary Examiner—Craig R. Feinberg
Attorney, Agent, or Firm—Schwartz, Jeffery, Schwaab, Mack, Blumenthal & Koch

[57] ABSTRACT

A piston has formed in the top thereof a part-spherical depression which forms part of a combustion chamber. The depression is so formed as to permit the flame front during the initial stage of combustion to reach the surface of the depression substantially at the same time, giving better conditions for efficient combustion and short combustion duration.

6 Claims, 5 Drawing Figures

COMBUSTION CHAMBER FOR SPARK IGNITION INTERNAL COMBUSTION ENGINE

BACKGROUND OF THE INVENTION

1. Field of the Invention

The present invention relates in general to combustion chambers for spark ignition internal combustion engines and more particularly to improvements in the shape of a combustion chamber.

2. Description of the Prior Art

A combustion chamber for a spark ignition internal combustion engine is shaped as for example shown in FIG. 1.

In FIG. 1, designated by the reference numeral 1 is a cylinder head, by 2 a cylinder block and by 3 a piston. Between these a combustion chamber 4 is defined. The cylinder head 1 is provided with an intake valve 5, a spark plug 6, etc.

In such combustion chamber 4, when the ignition spark by means of the spark plug 6 occurs, flame spreads from the zone around the spark plug 6 in all directions. In this instance, since the top of the piston 3 comes close to the spark plug 6 at the time of the ignition spark, a considerable part of the flame front collides with the flat top of the piston 3 and is checked thereby from propagating further.

For this sake, the propagation of the initial flame front is not smooth nor stable, causing the possibility that the flame cannot sweep throughout the combustion chamber 4 within a short interval or duration. This is particularly true when the engine is operated under some specific conditions.

With a view to protecting the initial flame front against such check, there has been proposed, as shown in FIG. 2, a piston 7 that has wedge-shaped depressions 7A and 7B formed in the top of the piston so that the rate of the initial combustion zone to the entire combustion chamber (hereinafter will be referred to as the rated initial combustion zone) is increased.

With this piston 7, it becomes possible to lengthen the interval during which the flame front moves from the spark plug 6 to the top of the piston 7 so as to permit the flame to spread to almost all areas or zones of the combustion chamber 8 during the lengthened interval.

When, however, a swirl or squish is produced so as to permit the charged gas to flow within the combustion chamber 8 in order to obtain efficient combustion of a lean mixture or a mixture under a high EGR (exhaust gas recirculation) rate, such shape of the combustion chamber 8 provides even worse conditions for short combustion duration since it tends to supress the desired gas flow within the combustion chamber.

SUMMARY OF THE INVENTION

A combustion chamber for a spark ignition internal combustion engine according to the present invention comprises a cylinder bore, a piston reciprocating in the cylinder bore, a cylinder head enclosing the cylinder bore and a spark plug disposed in the cylinder head. The piston has formed in the top thereof a part-spherical depression which is so shaped and located as to permit the flame front during the initial stage of combustion to reach the surface of the depression substantially at the same time. The combustion chamber the shape of which is partly defined by such depression, is quite effective in attaining a shortened combustion duration as well as efficient combustion. Furthermore, since the depression is simply shaped, swirl or squish is effectively given to the mixture within the combustion chamber to provide better conditions for efficient combustion of a lean mixture or a mixture under a high EGR rate.

It is therefore an object of the present invention to provide a combustion chamber for a spark ignition internal combustion engine which is simple in shape and gives better conditions for efficient combustion and short combustion duration particularly when swirl or turbulence is produced in the air-fuel mixture within the combustion chamber.

BRIEF DESCRIPTION OF THE DRAWINGS

The features and advantages of the combustion chamber according to the present invention will become more clearly appreciated from the following description taken in conjunction with the accompanying drawings, in which.

DESCRIPTION OF THE PREFERRED EMBODIMENTS

Figure 1:
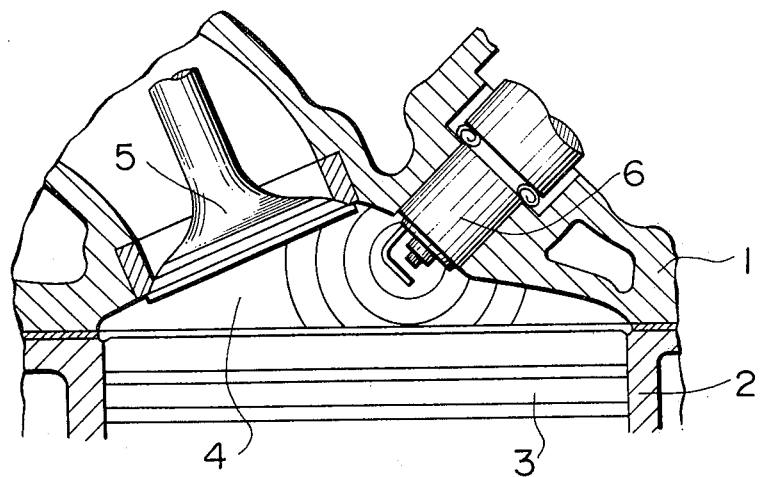
FIG. 1 is a cross sectional view showing a prior art combustion chamber of a spark ignition internal combustion engine.
Figure 2:
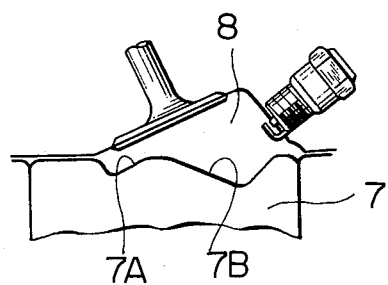
FIG. 2 is a schematic cross sectional view showing another prior art combustion chamber.
Figure 3:
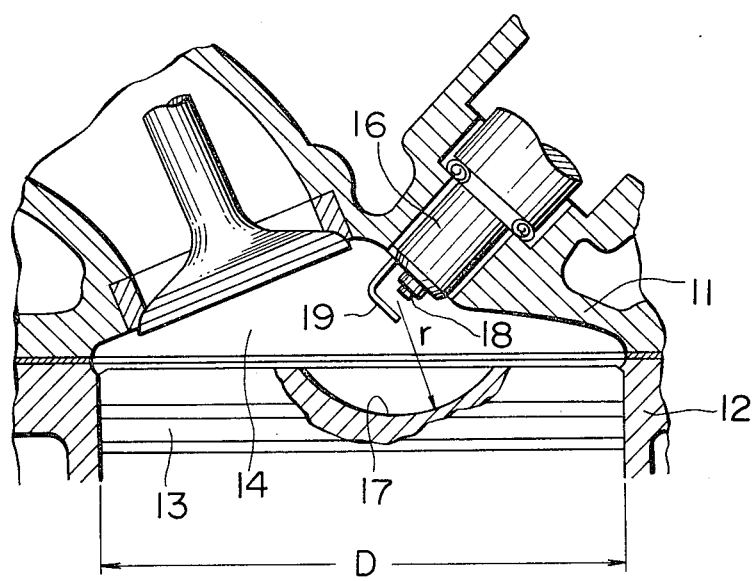
FIG. 3 is a cross sectional view showing a combustion chamber of a spark ignition internal combustion engine embodying the present invention.

Referring to FIG. 3, a combustion chamber for a spark ignition internal combustion engine according to an embodiment of this invention will be described.

In FIG. 3, designated by the reference numeral 11 is a cylinder head, by 12 a cylinder block and by 13 is a piston. Between these a combustion chamber 14 is defined. The cylinder block 12 is formed with a cylinder bore that receives the piston 13 and that is closed by a dished lower surface of the cylinder head 11. The cylinder head 11 is affixed to the cylinder block 12 in a known manner to enclose the cylinder bore. An intake valve 15, a spark plug 16 and other components are disposed in the cylinder head 11. Spark plug 16 has electrodes 18 and 19 which extend only minimally into combustion chamber 14.

It is to be noted that according to the present invention a semi- or part-spherical depression 17 is formed in the top of the piston 13 and that electrodes 18 and 19 extend into combustion chamber 14 by a distance which is less than the radius of depression 17. The depression 17 is so shaped and located as to permit the flame front during the initial stage of combustion to reach the surface of the depression substantially at the same time. More specifically, the depression 17 is formed such that, when the piston 13 is at or near top dead center, the surface of the depression constitutes part of the surface of a sphere with a center thereof located in the middle of the spark gap between the electrodes 18 and 19 of the spark plug 16. That is, the surface of the depression constitutes part of the surface of a sphere with a center thereof conforming to the igniting point of the spark plug. In this instance, according to the experiments conducted by the Applicants of this application it is found most effective for good burning conditions to set the radius (r) of the sphere such that r/D=0.1 to 0.5, where D=the cylinder bore.

In the combustion chamber 14 the shape of which is partly defined by the depression 17, when the ignition spark by means of the spark plug 16 occurs ahead of compression top dead center, a small ball of flame (nucleus of flame) develops in the spark gap of the spark plug and combustion begins in the zone around the nucleus. The flame front then spreads thereform in all directions like widening wave rings or enlarging spheres.

In this instance, due to the provision of the part-spherical depression 17 in the top of the piston 16, the propagation of the initial flame front is maintained smooth and stable for a lengthened period during which the combustion is completed in almost all areas or zones of the combustion chamber, effecting an increase in the rated initial combustion zone and a shortened combustion duration.

Furthermore, since the depression 17 is formed in a simple shape, even when swirl or squish is given to cause a gas flow within the combustion chamber 14, the depression does not constitute a significant resistance for the gas flow. That is, the supressing action effected by the depression is so weak as to be acceptable. Within the combustion chamber 14, swirl or squish therefore can be given to the flame front effectively, providing better conditions for a stable and efficient combustion of a lean mixture or a mixture under a high EGR rate and thereby effecting a shortened combustion duration.

Figure 4:
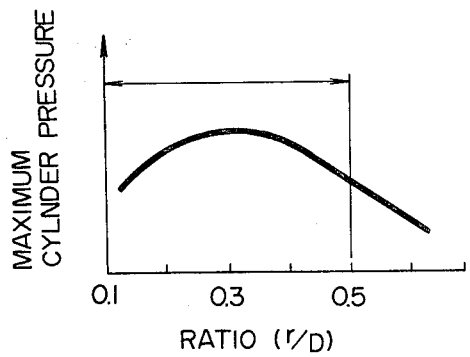
FIG. 4 is a graph showing the relation between a combustion condition and the size of a depression in the top of a piston which defines part of the combustion chamber of FIG. 3.

FIG. 4 shows the relation between a maximum cylinder pressure representing a combustion condition and a ratio (r/D). As will be seen from this graph, better combustion conditions are obtained when the ratio (r/D) is from 0.1 to 0.5.

Figure 5:
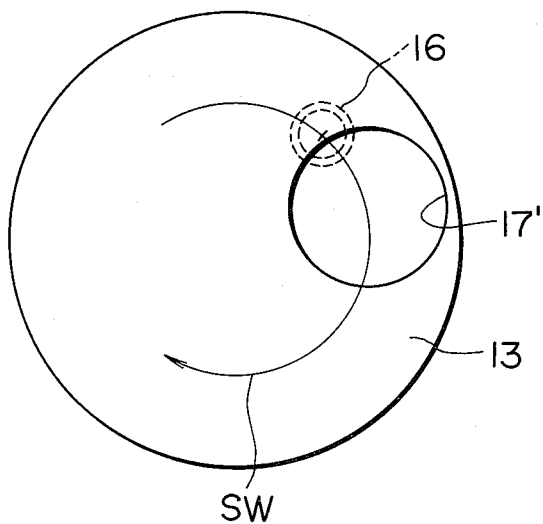
FIG. 5 is a top plan view of a piston, showing another embodiment of the present invention.

FIG. 5 shows another embodiment of this invention. In this embodiment, the depression 17' only differs from that of FIG. 3 in its location in the top of the piston 16. That is, the depression 17' is displaced from the position of FIG. 3 so that, when swirl is given and the nucleus of flame is being moved during the combustion under the effect of the swirl, the flame front may reach the surface of the depression substantially at the same time. That is, in this embodiment, the surface of the depression 17' constitutes, when the piston 16 is at or near top dead center, part of the surface of a sphere with a center located on a plane substantially parallel to the top of the piston 13 and containing the igniting point of the spark plug 16, and the center of the sphere is spaced from the igniting point along a circle around the axis of the cylinder bore or along an arc concentric to the cylinder bore in the direction (SW) of the gas swirl or flow within the combustion chamber.

As a result, the propagation of the initial flame front can be maintained smooth and stable even when the swirl is given to the mixture within the combustion chamber.

What is claimed is:

1. A combustion chamber for a spark ignition internal combustion engine comprising a cylinder bore, a piston reciprocating in said cylinder bore, a cylinder head having a non-spherical sinuous surface enclosing said cylinder bore and a spark plug disposed in said cylinder head, said piston having formed in a top thereof a volume formed by a part-spherical depression that has a surface which is so shaped and located as to permit a flame front during an initial stage of combustion to reach the entire surface of said depression substantially simultaneously, and wherein said spark plug has electrodes which extend into said combustion chamber by a distance less than a radius of curvature of said depression, in which the radius of curvature of said depression forms a ratio to that of the cylinder bore of 1:10 to 1:2, wherein the surface of said cylinder head bounds a volume which is substantially greater than said volume formed by said depression.

2. A combustion chamber for a spark ignition internal combustion engine as set forth in claim 1 wherein when said piston is approximately top dead center, the surfaces of said part-spherical depression form part of the surface of a sphere with a center located on a plane substantially parallel to the top of said piston and containing the igniting point of said spark plug, the center of said sphere being positioned on a circle containing said ignition point and disposed around the axis of said cylinder bore.

3. A combustion chamber as claimed in claim 2, wherein said center of said sphere is spaced from said igniting point along said circle in the direction of gas flow within said combustion chamber.

4. A combustion chamber as claimed in claim 2, wherein said center of said sphere is coincident with said igniting point when said piston is at or near top dead center.

5. A combustion chamber for a spark ignition internal combustion engine comprising a cylinder bore, a piston reciprocating in said cylinder bore, a cylinder head having a non-spherical sinuous surface enclosing said cylinder bore and a spark plug mounted in said cylinder head, said piston having formed in a top thereof a volume formed by a part-spherical depression with a surface which constitutes part of a surface of a sphere with a center thereof conforming to an igniting point of said spark plug when said piston is approximately top dead center, and wherein said spark plug has electrodes which extend into said combustion chamber by a distance less than a radius of said sphere, in which the radius of said sphere forms a ratio to that of the cylinder bore of 1:10 to 1:2, wherein said surface of said cylinder head bounds a volume which is substantially greater than said volume of said depression.

6. A combustion chamber as claimed in claim 5 in which the radius (r) of said sphere is set such that r/D=0.1 to 0.5, where D=the cylinder bore.

* * * * *